July 22, 1930.  H. SCHLAICH  1,771,194

MEANS FOR ATTACHING CAPILLARY TUBES TO BULBS

Filed Aug. 10, 1928

Inventor
Herman Schlaich.
By his Attorneys

Patented July 22, 1930

1,771,194

UNITED STATES PATENT OFFICE

HERMAN SCHLAICH, OF ELMHURST, NEW YORK

MEANS FOR ATTACHING CAPILLARY TUBES TO BULBS

Application filed August 10, 1928. Serial No. 298,772.

This invention relates to temperature responsive elements used in heat actuated instruments of the distance type, and more particularly to improved means for securing the capillary tubing to the temperature responsive elements. My invention may be regarded as an improvement over the instrument disclosed in my co-pending application, Serial No. 138,951, filed October 1, 1926. In that application is disclosed a temperature responsive element consisting of a plug or disk shape perforated to receive the capillary and fitting the top of the shell containing the heat responsive fluid. By means of such construction it is possible to solder the capillary tubing to the plug and the plug to the shell, as well as to stiffen the braid or other armour of like nature surrounding the capillary by the action of the solder, all in one operation. The present invention, in addition to preserving the advantages of the invention of said previous application, seeks to provide an attaching means for the purpose which will afford greater protection to the capillary tube itself during the brazing or soldering operation than would be afforded by the armour alone around the tube. It further contemplates provision of means which will also support both the capillary tube and its surrounding sheath or armour whereby a union of a greater strength and durability is had, and in which danger of injury to the capillary at such a union is reduced to a minimum. Other objects to be attained and advantages of the invention will be more fully apparent by reference to the following detailed description taken with the annexed drawing in which:

Figure 1:
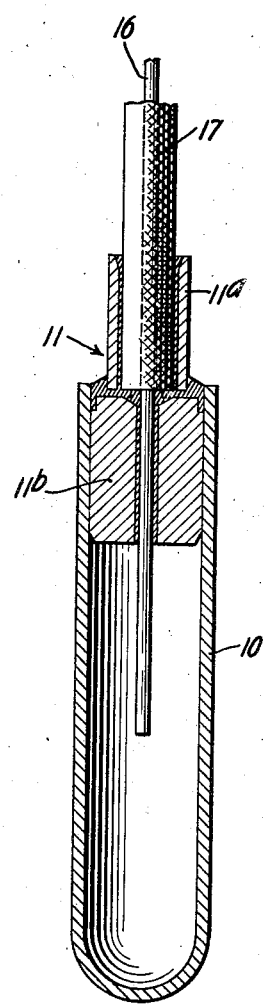
Figure 1 is a view partly in section of the parts in place, the same being an illustrative embodiment of the invention.

Referring to the drawings by characters of reference, 10 denotes the shell of the temperature responsive element into which fits more or less tightly the plug denoted generally by 11. This plug has an upper portion $11^a$ and a lower portion or plug proper $11^b$, which latter is provided with a central bore 12 of slightly larger size than the capillary which it is to receive. Portion $11^a$ has a bore 13 of larger dimensions adapted to receive the sheath of the capillary tubing. Intermediate said portions $11^a$ and $11^b$, I preferably provide slots 14, 14 to provide for application of the solder. Preferably also the lower portion of the plug is formed with a shoulder 15 for the reception of solder, as will be apparent hereafter.

Figure 2:
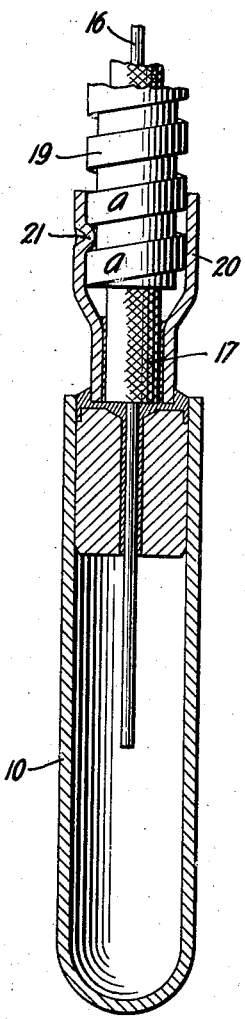
Figure 2 is a view similar to Fig. 1, but showing the application of my improved connector to capillary tubing having an additional form of protecting armour.
Figure 3:
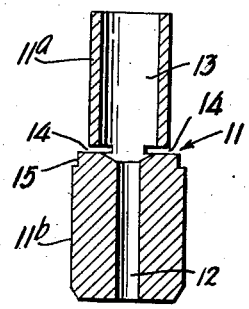
Figure 3 is a view in section of my improved connecting plug before soldering.
Figure 5:
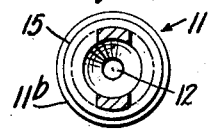
Figure 5 is a view taken through the restricted portion of Fig. 3.

In use, the plug will be driven into the shell 10 so that the plug proper $11^b$ will project slightly below the top of the shell as shown in Figures 1 and 2. Then the capillary tubing consisting of the capillary proper 16 and a sheath 17 which may be formed of braided metal wire, is introduced in the plug as shown in Figure 1, it being noted that the bore 13 is slightly larger than the said sheath. The brazing torch is then applied after which the proper quantity of high melting point solder, preferably hard or silver solder, is placed at the top of the shell 10 whereupon, due to the heat of the parts, such solder will flow through the slots 14 covering the top of the plug portion proper $11^b$ below the top of shell 10 and the groove or gutter formed by the shoulder 15 and the shell 10. Due to the fact that the space between the capillary and the bore 12 and that between the sheath 17 and the bore 13 are of small dimensions, the solder will fill up such spaces, as clearly shown in Figures 1 and 2. It will be seen that in the one operation, the plug 11 is soldered to the shell 10, the capillary to said plug as well as the sheath 17 thereto. Furthermore, some of the solder will penetrate through the braid and will serve to stiffen same. At the same time due to the fact that the flame of the brazing torch is separated from the capillary by means of the upwardly extending portion 11ᵃ, such capillary is adequately protected from the heat of the flame.

Figure 4:
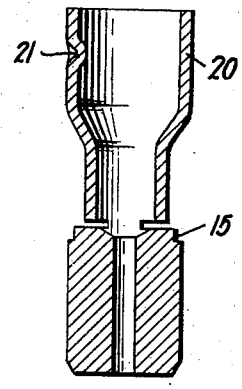
Figure 4 is a similar view of the form shown in Fig. 2.

In Figures 2 and 4 I have shown a modified form of the plug to be used in case the capillary has an additional sheaf 19 of spiral form, such plug consisting of a flared upper portion having an indenture 21 fitting between the threads *a* of said sheath.

It will be noted that this construction has the additional advantage that it affords anchorage for the outer sheath 19 without which the free end thereof would have the tendency to ride up from the shell 10 and leave the capillary wholly or partially exposed, and due to vibration to chafe the parts at the union of the capillary with the shell. If desired the indenture 21 may be made after assembling and soldering whereby a somewhat tighter fitting of the parts may be had.

It will be understood that variations may be resorted to within the scope of the invention and that parts of the improvement may be used without others.

What I claim is:

1. In a temperature operated device, in combination, a shell, a plug having a portion lying completely in the mouth of the shell, a capillary tube inserted through the plug and solder sealing the plug to the shell and to the capillary tube, said plug having an upwardly extending sleeve portion surrounding said capillary tubing and adapted to protect same from the heat of the brazing operation.

2. In a temperature operated device, in combination, a shell, a plug having a portion lying completely in the mouth of the shell and extending downwardly therein for a substantial portion of the length thereof, a capillary tube inserted through the plug and solder covering the top of the inserted portion of the plug and sealing the plug to the shell and to the capillary tube, said plug having an upwardly extending sleeve portion surrounding said capillary tubing and protecting same from the heat of the brazing operation.

3. In a temperature operated device, in combination, a shell, a plug having a portion lying completely in the mouth of the shell, a capillary tube inserted through the plug and sealing the plug to the shell and to the capillary tube, said plug having a portion of diminished diameter at the top thereof whereby to form with said shell a recess to contain solder.

4. In a temperature operated device, in combination, a shell, a plug having a portion lying completely in the mouth of the shell, a capillary tube inserted through the plug and solder sealing the plug to the shell and to the capillary tube, said plug having an upwardly extending sleeve portion surrounding said capillary tubing and protecting same from the heat of the brazing operation, said plug having a slot therein intermediate the length thereof for the purpose of receiving the solder and permitting the same to flow longitudinally of the plug, to have access to said capillary.

5. In a temperature operated device, in combination, a shell, a plug having a portion lying completely in the mouth of the shell, a capillary tube inserted through the plug, said capillary being provided with armour, solder sealing the plug to the shell and to the capillary tubing, said plug having an upwardly extending sleeve portion surrounding said armour and tube, protecting the capillary from the heat of the brazing operation.

6. In a temperature operated device, in combination, a shell, a plug having a portion lying completely in the mouth of the shell, a capillary tube inserted through the plug, said capillary being provided with armour consisting of an inner layer and an outer layer, solder sealing the plug to the shell and to the capillary tubing, said plug having an upwardly extending sleeve portion surrounding said armor and having means for engaging said outer layer.

7. A device according to claim 6 in which the outer layer terminates before the inner layer and in which the sleeve portion is attached to the outer layer.

In testimony whereof I have affixed my signature to this specification.

HERMAN SCHLAICH.